3,284,330
METHOD OF PHOTONITROSATION OF CYCLOALKANES
Yoshikazu Ito, Mizuho-ku, Nagoya, and Ryoh Endoh, Aichi-gun, Aichi-ken, Japan, assignors to Toyo Rayon Kabushiki Kaisha, Tokyo, Japan, a corporation of Japan
No Drawing. Filed Sept. 17, 1962, Ser. No. 224,243
Claims priority, application Japan, Sept. 22, 1961, 36/34,318
2 Claims. (Cl. 204—162)

This invention relates to a method of obtaining products in good yield and high quality by effecting a stabilized nitrosation reaction in obtaining nitrosocycloalkane or the cycloalkanone oximes, the derivatives thereof, by causing nitrosyl chloride, hydrogen chloride and light to act on cycloalkanes. It has been known hitherto to obtain nitrosated products of cycloalkanes or cycloalkanone oximes, the derivatives thereof, by causing nitrosyl chloride, and hydrogen chloride gas to act on cycloalkanes while irradiating with light.

In this instance, 1 mol of the hydrogen chloride gas is consumed per 1 mol of the cycloalkane, and together with 1 mol of hydrogen chloride that is produced as a by-product of the direct reaction of cycloalkane and nitrosyl chloride is in the form in which 2 molecules of hydrochloric acid are added, forms a hydrochloric acid addition salt of cycloakanone oximes.

The present invention concerns a method of photonitrosating cycloalkanes which is characterized in that a hydrogen chloride gas in excess of that consumed in the formation of the hydrochloric acid addition salt is fed to the photochemical reaction system and the mixed waste gas containing the hydrogen chloride gas that is recovered from the reaction system is recycled to the system while making direct replenishments of the nitrosyl chloride and hydrogen chloride gas in amounts to replace the respective amounts thereof that have been consumed by the reaction.

According to the conventional method a new supply of mixed gas of nitrosyl chloride and hydrogen chloride is constantly introduced into the system. In this case there is a tendency for the concentration of the nitrosation agent in the gas to be too high. As a result, the concentration of nitrosyl chloride which is dissolved in the cycloalkanes that participates in the reaction becomes excessively great in the whole or parts of the solution so that the product formed by the photonitrosation reaction and the excess nitrosyl chloride sets up a further secondary reaction thereby forming by-products whereby not only the yield of the intended product falls but also the by-product resulting from the secondary reaction contaminates the system. Consequently, the passage of the light that can be utilized for the photonitrosation reaction is impeded, and at the same time the by-products becoming mixed in the intended photonitrosated product the quality thereof is markedly deteriorated. This defect becomes a highly troublesome technical difficulty for the smooth and effective practice of the nitrosation reaction.

For overcoming such a difficulty, we have already proposed previously the use of hydrogen chloride in an amount that is in excess of that consumed in the formation of the aforementioned hydrochloric acid addition salt, whereby it was possible to effect the nitrosation very efficiently. In this instance, a mixed gas of nitrosyl chloride and hydrogen chloride gas is fed to the photochemical reaction system, and for reusing in the reaction the mixed waste gas containing the hydrogen chloride gas that is recovered from the foregoing system a very complicated means is resorted to which comprises first causing the hydrogen chloride contained in the waste gas to be absorbed into water or a dilute hydrochloric acid aqueous solution to recover it as an aqueous hydrochloric acid solution and then regenerating the hydrogen chloride from this recovered liquid and reusing it again in the photonitrosation reactions. This becomes a disadvantage when an excess of hydrogen chloride is to be used.

When we furthered our researches for method that would make it possible to satisfactorily surmount at the same time such a disadvantage and the already mentioned technical difficulty of the conventional method so that the photonitrosation reaction of cycloalkanes could be carried out under more stable conditions so as to make possible the obtaining of the product with excellent quality and in good yield very advantageously and effectively on a commercial scale, we found that, for the purpose of re-using the hydrogen chloride gas by recovering it in good yield when, as described hereinbefore, the hydrogen chloride in the waste gas is first caused to be absorbed into water or a dilute hydrochloric acid aqueous solution and then recovered as an aqueous hydrochloric acid solution and thereafter the hydrogen chloride gas is regenerated from this solution and recycled into the reaction system, a part of the NOCl contained in the waste gas dissolves in water or the dilute hydrochloric acid solution in the form of nitrous acid while a part not dissolving becomes lost. The NOCl that has dissolved evolves as NO together with HCl when the HCl is regenerated by heating. This NO is contained in the mixed gas of NOCl and HCl in an amount of about .2%. Thus, in normal commercial operations the NO gas becomes mixed in and accumulates in the gas to be circulated in an amount which is of an extent as will not permit its being ignored. Therefore, we found that this would have an effect on the fluctuation of the composition of the recycled gas and hence in bringing about non-uniformity of the nitrosation reaction which could not be ignored. In addition, we found that by replenishing the waste gas directly with nitrosyl chloride and hydrogen chloride gas without going through the regeneration steps the reaction could be carried on under stable conditions and the fluctuation in the concentration of nitrosyl chloride could be very staisfactorily controlled. Furthermore, it was also found that since it becomes exceedingly simple to adjust the nitrosyl chloride in the gas to be introduced into the reaction system to a low concentration, the technical difficulty of the conventional method could be advantageously surmounted and the product obtained in good yield and high quality. In addition, not only does the complicated and uneconomical procedures involved in the step of regenerating the hydrogen chloride become entirely unnecessary but also the losses of hydrogen chloride and of the unreacted nitrosation agent are completely eliminated, thus making it possible to carry out the photonitrosation reaction with great advantage.

Accordingly, it is an object of the present invention to provide a method of photonitrosating cycloalkanes in which are surmounted at the same time the technical difficulty of the conventional method as well as the disadvantage involved in recovering the hydrogen chloride gas attending its use in excess as previously proposed by us, thus making possible the carrying out of the reaction under far stabler conditions whereby nitrosocycloalkanes or the cycloalkanone oximes, the derivatives thereof, are very advantageously and effectively obtained on a commercial scale in good yield and high quality.

Other objects of this invention will become apparent from the following description.

In nitrosating cycloalkanes according to the present invention by reacting while irradiating with light a nitrosation agent and hydrogen chloride gas with cycloalkanes, hydrogen chloride gas particularly in excess of that consumed in the formation of the hydrochloric acid addition salt is fed to the photochemical reaction system and the mixed waste gas containing the hydrogen chloride gas that is recovered from the system is recycled to the system while making direct replenishments of the nitrosyl chloride and hydrogen chloride gas in amounts to replace the respective amounts thereof that have been consumed by the reaction. In this instance, while the total quality used of the hydrogen chloride gas is a quantity exceeding the equimolar quantity of the cycloalkanes first fed, normally being of the order of about 8–200 mols, from the operations standpoint that of the order of 10–100 mols is preferred. As the reaction proceeds, the mixed waste gas containing the hydrogen chloride gas that is recovered from the system is recycled to the system while making direct replenishments of the nitrosyl chloride and hydrogen chloride gas in amounts to replace the respective amounts thereof that have been consumed by the reaction.

According to this invention, the means of removing the hydrogen chloride gas from the waste gas must not be involved, it being required that direct replenishment of the nitrosyl chloride and hydrogen chloride gas be made to the waste gas that is recovered from the reaction system. The quantities to be replenished of the nitrosyl chloride and hydrogen chloride gas need only be quantities thereof that have been consumed by the reaction.

The cycloalkanes used in the invention include the cycloalkanes containing 5 to 14 carbon atoms such as cyclopentane, cyclohexane, cyclooctane and cyclododecane.

In order for a better understanding the following examples are given, it being understood that invention is not limited thereby.

*Example 1*

A jacketed cylindrical reaction chamber with a glass-lined interior, and having an inside diameter of 300 mm. and length of 700 mm. and fitted with a withdrawal outlet at its bottom was provided in its central part with a 5 kw. high pressure mercury lamp equipped with an exterior cooling pipe of glass. To this was added about 30 liters of cyclohexane, and the uppermost point of the light emitting part of the mercury lamp was made to be present in the cyclohexane liquid. The reactor was maintained during the reaction at 15° C. by being cooled with the jacket surrounding the reactor.

When a mixed gas of nitrosyl chloride and hydrogen chloride containing 5% by volume of the former was passed through this reaction system at the rate of 60 liters per minute, oil-like cyclohexaneoxime hydrochloride was formed at the rate of 1,390 grams per hour, and a waste gas of nitrosyl chloride and hydrogen chloride containing about 0.6% of the former was discharged at the rate of about 54 liters per minute. This waste gas was again fed to the foregoing photoreaction system and a cycling system of the hydrogen chloride gas was set up, and by adding to this system at the rate of about 3 liters per minute a mixed gas of nitrosyl chloride and hydrogen chloride containing about 50% of the former, the reaction was effected in the regular manner. In this case, the fluctuation in the concentration of the nitrosyl chloride gas in the mixed gas of nitrosyl chloride and hydrogen chloride was 5±1%, and the oil-like cyclohexaneoxime hydrochloride formed which was obtained in an amount that reached about 1,390 grams per minute, as indicated above, was of light orange shade and transparent with no mixture of impurities being observable.

In contrast, when as a control, a mixed gas of nitrosyl chloride and hydrogen chloride containing about 50% of the former was fed at the rate of about 3 liters per minute into the reaction system continuously as a fresh mixed gas as in the conventional method, the fluctuation in the concentration of the nitrosyl chloride reached a value as high as 50±5%. In addition, the quantity of the oil-like cyclohexanoneoxime hydrochloride formed even at the beginning of the reaction was about 1100 grams per minute, which was less than in case of the method of the present invention. Furthermore, the cyclohexanoneoxime hydrochloride formed contained a black by-product that had been formed in the reaction system. The rate of formation also fell gradually so that 3 hours after the start of the reaction it was only about 50% of the rate to begin with.

*Example 2*

Using the same apparatus as in Example 1 and as the starting material, cyclooctane, the temperature of the reactor was maintained at 20° C. during the reaction. When a mixed gas of nitrosyl chloride and hydrogen chloride containing 5% of the former was fed into this system at the rate of 60 liters per minute, oil-like cyclohexanone-oxime hydrochloride was formed at the rate of 1600 grams per minute, and about 55 liters per minute of a mixed gas of nitrosyl chloride and hydrogen chloride containing 0.7% of the former was discharged.

This charged gas was again fed to the photoreaction system to set up a cycling system of the hydrogen chloride gas. By adding to this system at the rate of about 3 liters per minute a mixed gas of nitrosyl chloride and hydrogen chloride containing about 50% of the former, the reaction was effected in the regular manner. In this case, there was no loss at all of the mixed gas of nitrosyl chloride and hydrogen chloride which was discharged from the reaction system.

On the other hand, when the mixed gas of nitrosyl chloride and hydrogen chloride containing about 0.7% of the former was first caused to be absorbed in a 20% aqueous hydrochloric acid solution and then reheated to regenerate hydrogen chloride, practically all of the nitrosyl chloride in the discharged gas being impossible of recovery became lost, while the quantity of the hydrogen chloride that was regenerated was about 96% of the hydrogen chloride absorbed. Thus there was a loss of about 4%.

Having thus described the nature of the invention, what we claim is:

1. In a method of photonitrosating cycloalkanes by reacting the same in a photoreaction system with nitrosyl chloride and hydrogen chloride gas while irradiating with light to provide hydrochloric acid addition salts of the corresponding cycloalkanone oximes, the improvement of feeding to the photoreaction system hydrogen chloride gas in excess of an equimolar quantity based on the amount of cycloalkane fed to the system, recovering from said photoreaction system a waste gas containing hydrogen chloride and nitrosyl chloride, adding to said waste gas nitrosyl chloride and hydrogen chloride gas in amounts to replace the respective amounts thereof that have been consumed by the reaction in said photoreaction system, and passing the resultant mixture of said waste gas and said additional nitrosyl chloride and hydrogen chloride gas streams into said photoreaction system to react with additional cycloalkanes therein.

2. The method of claim 1 in which said cycloalkanes are cycloalkanes having 5 to 14 carbon atoms.

References Cited by the Examiner
UNITED STATES PATENTS 2,879,215 3/1959 Reppe et al. _____ __204—162
3,060,173 10/1962 Von Schickh et al. ____ 204—162

JOHN H. MACK, *Primary Examiner.*

JOHN R. SPECK, *Examiner.*

H. S. WILLIAMS, *Assistant Examiner.*